(12) United States Patent
Yang et al.

(10) Patent No.: US 6,607,795 B1
(45) Date of Patent: Aug. 19, 2003

(54) OXYGEN SCAVENGING COMPOSITIONS COMPRISING POLYMERS DERIVED FROM AROMATIC DIFUNCTIONAL MONOMERS

(75) Inventors: Hu Yang, San Ramon, CA (US); Ta Yen Ching, Novato, CA (US); Peter Kwan, San Ramon, CA (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 41 days.

(21) Appl. No.: 10/024,835

(22) Filed: Dec. 19, 2001

(51) Int. Cl.⁷ .......................... B32B 27/36; B32B 27/40; B32B 27/08; B32B 27/10; B32B 27/16; B32B 27/18; B32B 27/34
(52) U.S. Cl. ...................... 428/34.2; 528/183; 528/206; 528/210; 528/211; 528/219; 528/272; 528/288; 528/302; 528/59; 528/61; 528/64; 528/67; 528/84; 528/85; 528/176; 428/35.7; 428/35.8; 428/36.6; 428/423.1; 428/423.3; 428/423.7; 428/424.2; 428/424.4; 428/424.6; 428/424.7; 428/424.8; 428/425.1; 428/425.8; 428/457; 428/458; 428/474.7; 428/475.2; 428/476.3; 428/476.9; 428/479.3; 428/480; 428/481; 428/483; 252/188.1; 252/188.28; 252/186.24; 524/175; 524/176
(58) Field of Search .............................. 428/34.2, 35.7, 428/35.8, 36.6, 423.1, 423.3, 423.5, 424.2, 424.4, 424.6, 424.8, 425.1, 425.8, 457, 458, 474.7, 474.8, 424.7, 475.2, 475.5, 475.8, 476.1, 476.3, 476.9, 479.3, 480, 481, 483; 252/188.1, 188.28, 186.24; 524/176, 175; 528/44, 59, 61, 64, 67, 84, 85, 183, 176, 206, 210, 211, 219, 272, 288, 302

(56) References Cited

U.S. PATENT DOCUMENTS 3,497,571 A 2/1970 Tellier et al. ............... 260/844
4,415,710 A 11/1983 Barnabeo et al. ........... 525/370
4,524,201 A 6/1985 Barnabeo et al. ........... 528/395
5,021,515 A 6/1991 Cochran et al. ............. 525/371

(List continued on next page.)

FOREIGN PATENT DOCUMENTS

WO WO 98/13266 * 4/1998
WO WO99/48963 9/1999

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond,* OSP Conference, pp. 1–8 (Chicago, Jun. 19–20, 2000).

(List continued on next page.)

*Primary Examiner*—Vivian Chen
(74) *Attorney, Agent, or Firm*—Williams, Morgan & Amerson, P.C.

(57) ABSTRACT

Herein is disclosed an oxygen scavenging composition, comprising (i) an oxygen scavenging polymer comprising units having structure I:

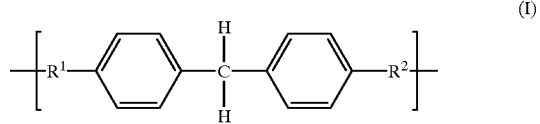

wherein $R^1$ and $R^2$ are independently selected from the group consisting of —O—, —NCO—, and —NR—, wherein R is selected from the group consisting of —H and —$C_1$–$C_6$ alkyls; (ii) a transition metal oxidation catalyst; and (iii) an energy-absorbing compound selected from the group consisting of microwave reactive materials and photoinitiators having a wavelength of maximum absorption of electromagnetic radiation from about 200 nm to about 750 nm. The oxygen scavenging composition can be used to form an oxygen scavenging packaging article.

38 Claims, 1 Drawing Sheet

U.S. PATENT DOCUMENTS

| | | | |
|---|---|---|---|
| 5,116,916 A | 5/1992 | Young | 525/350 |
| 5,153,038 A | 10/1992 | Koyama et al. | 428/35.8 |
| 5,211,875 A | 5/1993 | Speer et al. | 252/188.28 |
| 5,254,804 A * | 10/1993 | Tamaki et al. | 84/626 |
| 5,274,024 A | 12/1993 | Koyama et al. | 524/440 |
| 5,281,360 A | 1/1994 | Hong et al. | 252/188.28 |
| 5,346,644 A | 9/1994 | Speer et al. | 252/188.28 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,547,765 A | 8/1996 | Degrassi et al. | 428/474.7 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,707,750 A | 1/1998 | Degrassi et al. | 428/475.8 |
| 5,716,715 A | 2/1998 | Degrassi et al. | 428/475.8 |
| 5,736,616 A | 4/1998 | Ching et al. | 525/330.3 |
| 5,759,653 A | 6/1998 | Collette et al. | 428/35.9 |
| 5,763,095 A | 6/1998 | Ramesh et al. | 428/474.4 |
| 5,776,361 A | 7/1998 | Katsumoto et al. | 252/188.28 |
| 5,837,158 A | 11/1998 | Shepodd et al. | 252/181.6 |
| 5,859,145 A | 1/1999 | Ching et al. | 525/330.6 |
| 5,866,649 A | 2/1999 | Hong et al. | 524/538 |
| 6,057,013 A | 5/2000 | Ching et al. | 428/35.7 |
| 6,063,307 A | 5/2000 | Shepodd et al. | 252/181.6 |
| 6,063,417 A | 5/2000 | Paleari et al. | 426/127 |
| 6,254,803 B1 * | 7/2001 | Matthews et al. | 252/188.28 |
| 6,527,976 B1 * | 3/2003 | Cai et al. | 252/188.28 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond,* OSP Conference Slides (Chicago, Jun. 19–20, 2000).

* cited by examiner

OXYGEN SCAVENGING COMPOSITIONS COMPRISING POLYMERS DERIVED FROM AROMATIC DIFUNCTIONAL MONOMERS

BACKGROUND OF THE INVENTION

1. Field of the Invention

The present invention relates generally to the field of oxygen scavenging compositions. More particularly, it concerns oxygen scavenging compositions comprising non-fragmenting oxygen scavenging polymers.

2. Description of Related Art

Organic polymers have made significant inroads into the packaging industry due to their design flexibility and the ability to be fabricated in various sizes and shapes commonly used in the packaging industry. The deployment of organic polymers into films, bottles, coatings, and liners is commonplace in the packaging industry. Although plastic materials offer the packaging industry many benefits, the application of plastic materials has remained inhibited in situations where there are special packaging requirements to prevent the ingress of exterior oxygen or to scavenge oxygen present inside the package. In some cases, particularly in the fruit juice and brewing industries, oxygen is removed from the product by vacuum, inert gas sparging, or both. However, it is difficult and expensive to remove the last traces of oxygen by these techniques, along with an additional disadvantage of tending to remove volatile aroma and flavor components in the products.

Another, more recent, technique for limiting oxygen exposure of packaged food products involves incorporating an oxygen scavenger into the packaging structure. One important class of oxygen scavengers is oxygen scavenging polymers. Oxygen scavenging polymers, in the presence of a suitable oxidation catalyst, scavenge (i.e., react irreversibly) with oxygen from either the inside of the package or ingressed from the exterior of the package. There have been extensive developments of oxygen scavenging technology in both flexible and rigid packaging application.

Depending on the type of application, there can be considered to be two categories of oxygen scavenging polymers. The first one is based on unsaturated addition polymers, such as polybutadiene or polyisoprene, which undergoes an allylic oxidation pathway in consuming oxygen. This type of oxygen scavenging polymer has demonstrated sufficient oxygen scavenging capability in flexible packaging structures, but the odor and taste alteration remains a concern for further commercial applications. For rigid packaging applications, polyolefin-based oxygen scavenging polymers suffer from the incompatibility with those polymers typically used in rigid packaging application, such as PET or nylon, among others. This includes physical incompatibility, which leads to loss of clarity critical for many rigid packaging applications, and incompatible processing due to the thermal stability of the polyolefin-based oxygen scavenging polymers in the temperature range typically used for processing rigid packaging polymers, such as PET.

The second category, of which MXD6 polyamide has been the only example, undergoes oxidation through —Ph—CH$_2$—NH— linkage on the polymer backbone. MXD6 polyamide has been demonstrated to improve oxygen barrier performance by scavenging the ingress of exterior oxygen into the bottle or container. However, the breakdown of the polymer chain and the generated by-products, such as aldehyde and acid volatile components, have limited the application of MXD6, especially in situations where direct food contact is required. The minimization or elimination of fragmentation of oxygen scavenging polymers has been a major challenge since the early development of this technology field. Thus, in spite of a long-recognized need and the large size of the potential market in the rigid packaging, it remains desirable to have oxygen scavenging polymers that do not generate fragments upon reaction with oxygen, and at the same time can withstand stringent process/fabrication processing conditions.

SUMMARY OF THE INVENTION

In one embodiment, the present invention relates to an oxygen scavenging composition, comprising:

an oxygen scavenging polymer comprising units having structure I:

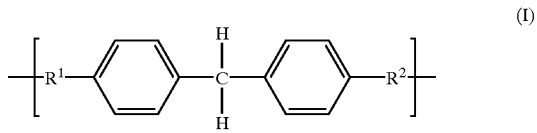

(I)

wherein $R^1$ and $R^2$ are independently selected from the group consisting of —O—, —C(=O)O—, —NH—, —NHC(=O)—, —NHC(=O)O—, and —NR—, wherein R is selected from the group consisting of —H and —C$_1$–C$_6$ alkyls;

a transition metal oxidation catalyst; and a photoinitiator having a wavelength of maximum absorption of electromagnetic radiation from about 200 nm to about 750 nm.

In another embodiment, the present invention relates to an oxygen scavenging composition, comprising:

an oxygen scavenging polymer comprising units having structure I, as described above, wherein $R^1$ and $R^2$ are independently selected from the group consisting of —O—, —C(=O)O—, —NH—, —NHC(=O)—, —NHC(=O)O—, and —NR—, wherein R is selected from the group consisting of —H and —C$_1$–C$_6$ alkyls;

a transition metal oxidation catalyst; and a microwave reactive material.

In still another embodiment, the present invention relates to an oxygen scavenging packaging article, comprising an oxygen scavenging layer comprising:

an oxygen scavenging polymer comprising units having structure I, as described above, wherein $R^1$ and $R^2$ are independently selected from the group consisting of —O—, —C(=O)O—, —NH—, —NHC(=O)—, —NHC(=O)O—, and —NR—, wherein R is selected from the group consisting of —H and —C$_1$–C$_6$ alkyls;

a transition metal oxidation catalyst; and an energy-absorbing compound selected from the group consisting of microwave reactive materials and photoinitiators having a wavelength of maximum absorption of electromagnetic radiation from about 200 nm to about 750 nm.

In yet another embodiment, the present invention relates to a method of initiating oxygen scavenging by an oxygen scavenging composition, comprising:

(a) providing an oxygen scavenging composition, comprising:

(i) an oxygen scavenging polymer comprising units having structure I, as described above, wherein $R^1$ and $R^2$ are independently selected from the group consisting of —O—, —C(=O)O—, —NH—, —NHC(=O)—, —NHC(=O)O—, and —NR—, wherein R is selected from the group consisting of —H and —$C_1$-$C_6$ alkyls;

(ii) a transition metal oxidation catalyst; and (iii) an energy-absorbing compound selected from the group consisting of microwave reactive materials and photoinitiators having a wavelength of maximum absorption of electromagnetic radiation from about 200 nm to about 750 nm; and (b) exposing the oxygen scavenging composition to electromagnetic radiation for a duration sufficient to initiate oxygen scavenging by the oxygen scavenging composition.

In still another embodiment, the present invention relates to a method of forming a polymer, comprising:

providing at least a monomer having structure IV:

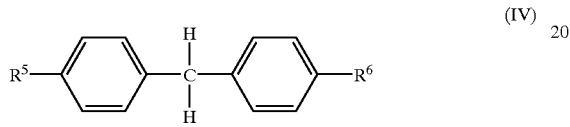

(IV)

wherein $R^5$ and $R^6$ are independently selected from the group consisting of —OH, —OR, —C(=O)OH, —C(=O)OR, —$NH_2$, —NHR, —$NR_2$, —NHC(=O)H, —NHC(=O)R, —NHC(=O)OH, and —NHC(=O)OR, wherein R is selected from the group consisting of —H and —$C_1$-$C_6$ alkyls; and a monomer having structure VI:

$R^7$—X—$R^8$ (VI)

wherein X is a hydrocarbon or substituted hydrocarbon; and $R^7$ and $R^8$ are selected from the group consisting of —OH, —OR, —C(=O)OH, —C(=O)OR, —$NH_2$, —NHR, —$NR_2$, —NHC(=O)H, —NHC(=O)R, —NHC(=O)OH, —NHC(=O)OR, and -halide; wherein R is selected from the group consisting of —H and —$C_1$-$C_6$ alkyls; and condensation polymerizing at least the monomer having structure IV and the monomer having structure VI, to form the polymer.

In yet a further embodiment, the present invention relates to a method of producing a packaging article comprising an oxygen scavenging layer, wherein the oxygen scavenging layer comprises a polymer comprising structure I:

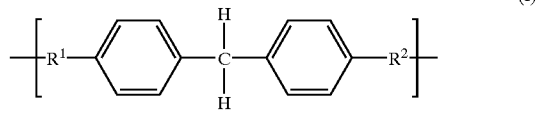

(I)

wherein $R^1$ is selected from the group consisting of —O— and —NH—, and $R^2$ is selected from the group consisting of —O— and —NH—, the method comprising:

providing a composition comprising the polymer comprising structure I, and forming the composition into a packaging article or an oxygen scavenging layer thereof.

The present invention provides an oxygen scavenging composition, and packaging articles comprising oxygen scavenging layers comprising the oxygen scavenging composition, which do not generate fragments upon reaction with oxygen.

DESCRIPTION OF ILLUSTRATIVE EMBODIMENTS

Figure 1:
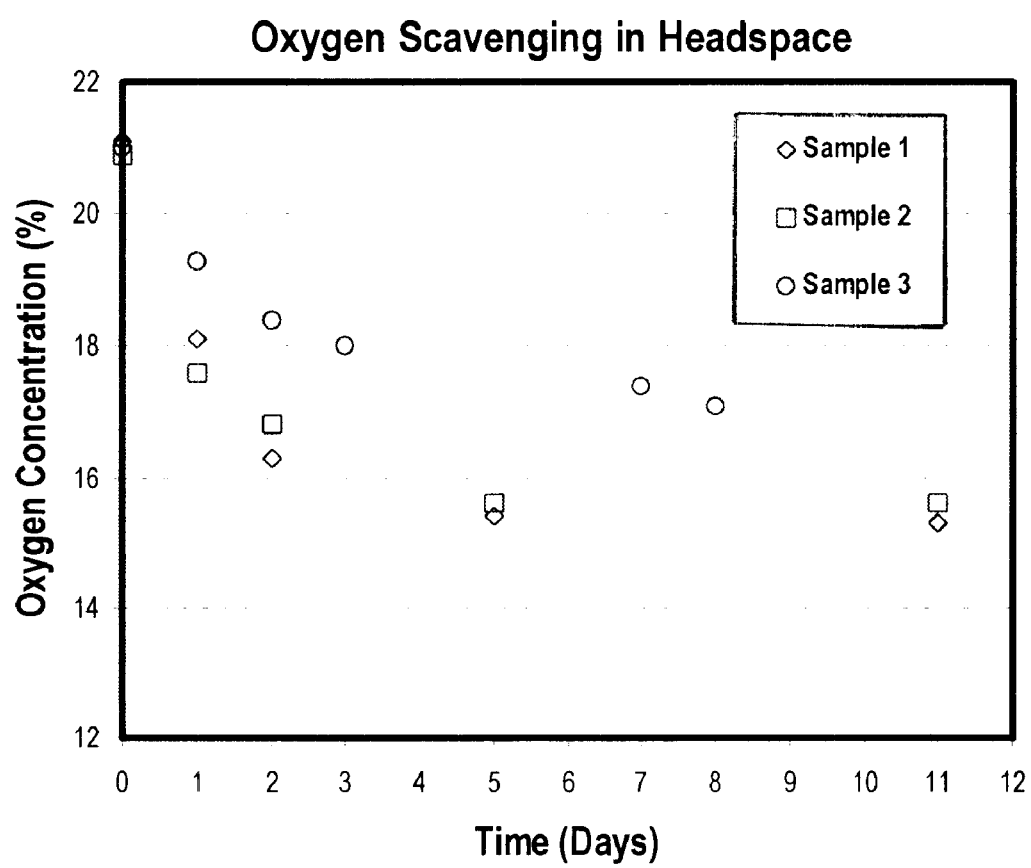
FIG. 1 plots the percent oxygen concentration as a function of time for three samples prepared and assayed as described in Example 1.

In one embodiment, the present invention relates to an oxygen scavenging composition, comprising:

an oxygen scavenging polymer comprising units having structure I:

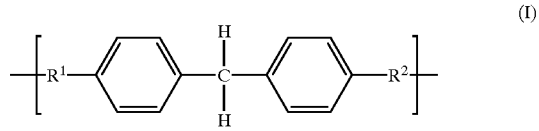

(I)

wherein $R^1$ and $R^2$ are independently selected from the group consisting of —O—, —C(=O)O—, —NH—, —NHC(=O)—, —NHC(=O)O—, and —NR—, wherein R is selected from the group consisting of —H and —$C_1$-$C_6$ alkyls;

a transition metal oxidation catalyst; and a photoinitiator having a wavelength of maximum absorption of electromagnetic radiation from about 200 nm to about 750 nm.

It has been observed that a polymer comprising structure I is capable of scavenging oxygen, and thus, in addition to other applications, is useful in oxygen scavenging or active oxygen barrier packaging applications. Though not to be bound by theory, it is believed that the polymer comprising structure I scavenges oxygen by undergoing oxidation on the —$CH_2$— moiety bridging the aromatic rings, which results in a diphenyl ketone unit having structure II:

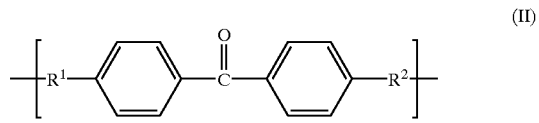

(II)

wherein $R^1$ and $R^2$ are as described above. Though not to be bound by theory, the ketone is believed to be very stable toward further oxidation and hydrolysis. As a result, the oxygen scavenging event does not result in fragmentation of the polymer, at least to any significant extent. This is in contrast to the prior art, which generally reports oxidation leading to a polymer structure that becomes more susceptible toward further oxidation and hydrolysis, eventually leading to fragmentation and the generation of volatile components.

The polymer may further comprise other unit(s), which are generally represented as

—X— (III)

wherein X is a hydrocarbon or substituted hydrocarbon, preferably having from about 1 to about 12 carbon atoms. By "substituted hydrocarbon" is meant a hydrocarbon comprising one or more heteroatoms, including, but not limited to, oxygen, silicon, and halogens, among others. Preferably, X is —$(CH_2)_n$—, wherein n is 1 to 12, or aryl. Preferably, the linkages between units having structure I and units having structure —X— are ester, amide, urethane, or ether linkages (i.e., $R^1$ and $R_2$ are —C(=O)O—, —C(=O)

NH—, —NH—C(=O)O—, or —O—, respectively), thus giving rise to polymers which are polyesters, polyamides, polyurethanes, or polyethers. Polyformal is a particularly preferred polyether.

The proportion of units having structure I to units having structure III can be from 1:99 mol % to 99:1 mol %. Preferably, the proportion of units having structure I to units having structure III is from about 40:60 mol % to about 60:40 mol %.

Alternatively, or in addition to structure III, the polymer comprising units having structure I can comprise other units linked to units having structure I, units having structure III, or both.

The polymer of the oxygen scavenging composition may, by way of example and not to be construed as limiting, be a homopolymer of units having structure I; a copolymer of units having structure I and units having structure III; a copolymer of units having structure I and units having a structure other than structure III; and a terpolymer of units having structure I, units having structure III, and other units; among others.

Copolymers, terpolymers, and higher order polymers can be random or block polymers.

The oxygen scavenging composition further comprises a transition metal. The transition metal functions to catalyze oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate, preferably $C_1$–$C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1% (10 to 10,000 ppm) of the oxygen scavenging composition, based on the metal content only (excluding ligands, counterions, etc.).

The oxygen scavenging composition also comprises a photoinitiator. Though not to be bound by theory, it is believed that photoinitiators absorb electromagnetic radiation and at least some of the energy of the electromagnetic radiation activates a chemical process or processes that result in the appearance of free radical electrons in the photoinitiator or fragments of the photoinitiator produced by the chemical process or processes. The photoinitiator will have a wavelength of maximum absorption of electromagnetic radiation (meaning a wavelength at which the extinction coefficient of the photoinitiator is higher than at any other wavelength) from about 200 nm to about 750 nm. Electromagnetic radiation in this range of wavelengths is readily produced by apparatus that can be conveniently included into package-formation or -filling procedures. Electromagnetic radiation in this range of wavelengths may also provide other useful activities, such as sterilizing a package prior to filling or activating other chemical reactions in the package which may be desired by the user.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the product).

Photoinitiators that are especially useful in the present invention include benzophenone derivatives containing at least two benzophenone moieties, as described in U.S. Pat. No. 6,139,770. These compounds act as effective photoinitiators to initiate oxygen scavenging activity in the oxygen scavenging layer of the present invention. Such benzophenone derivatives typically have a very low degree of extraction from the oxygen scavenging layer, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicyclic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as, for example, an ether, ketone, aldehyde, ester, or alcohol.

The substituents of B, herein R", when present, are individually selected from alkyl, aryl, alkoxy, phenoxy, or alicylic groups containing from 1 to 24 carbon atoms, or halides. Each benzophenone moiety can have from 0 to 9 substituents.

Preferably, the combined molecular weight of the A and R" groups is at least about 30 g/mole. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

As stated above, the amount of photoinitiator can vary. In many instances, the amount will depend on the blend ratio or the particular oxygen scavenging polymer present in the oxygen scavenging composition, the wavelength and intensity of UV radiation used, the nature and amount of any antioxidants present in the oxygen scavenging composition, as well as the type of photoinitiator. The amount of photoinitiator also depends on the intended use of the composition. For instance, if the photoinitiator-containing composition is intended for use in a packaging article as a layer placed underneath a second layer which is somewhat opaque to the radiation used, more initiator may be needed. For most purposes, however, the amount of photoinitiator is in the range of 0.01 to 10% by weight of the oxygen scavenging layer.

In another embodiment, the present invention relates to an oxygen scavenging composition, comprising:

an oxygen scavenging polymer comprising units having structure I:

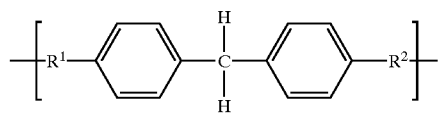

(I)

wherein $R^1$ and $R^2$ are independently selected from the group consisting of —O—, —C(=O)O—, —NH—, —NHC(=O)—, —NHC(=O)O—, and —NR—, wherein R is selected from the group consisting of —H and —$C_1$-$C_6$ alkyls;

a transition metal oxidation catalyst; and a microwave reactive material.

The oxygen scavenging polymer and the transition metal oxidation catalyst are as described above.

The composition also comprises a microwave reactive material. Though not to be bound by theory, it is believed that microwave reactive materials absorb electromagnetic radiation in the microwave range, and at least some of the energy of the microwaves activates a chemical process or processes that result in the appearance of free radical electrons in the photoinitiator or fragments of the microwave reactive material produced by the chemical process or processes. Microwaves are readily produced by apparatus that can be conveniently included into package-formation or -filling procedures. Microwaves may also provide other useful activities, such as sterilizing a package prior to filling or activating other chemical reactions in the package which may be desired by the user.

In certain preferred embodiments of the invention, the microwave reactive material is selected from the group consisting of metal materials and materials comprising polar compounds. Preferred polar compounds include water, peroxides, and peroxide solutions. Preferred peroxides include inorganic peroxides selected from the group consisting of sodium percarbonate, potassium percarbonate, calcium percarbonate, and sodium percarbonate, and organic peroxides selected from the group consisting of 2,5-dimethyl-2,5-di(benzoylperoxy) hexane; t-amyl peroxyacetate; t-amyl peroxybenzoate; t-butyl peroxyacetate; t-butyl peroxybenzoate; di-t-butyl diperoxyphthalate; 2,2-di-(t-butylperoxy) butane; 2,2-di(t-amylperoxy) propane; n-butyl 4,4-di(t-butylperoxy) valerate; ethyl 3,3-di-(t-amylperoxy) butyrate; ethyl 3,3-(t-butylperoxy) butyrate; di-α-cumyl peroxide; α,α'-di-(t-butylperoxy) diisopropylbenzene; 2,5-dimethyl-2,5-di-(t-butylperoxy) hexane; di-t-amyl peroxide; t-butyl α-cumyl peroxide; di-t-butyl peroxide; 2,5-dimethyl-2,5-di-(t-butylperoxy)-3-hexyne; di-t-butyl peroxide; di-t-amyl peroxide; and t-butyl hydroperoxide.

Where the microwave reactive material is a metal material, it can suitably be in a form selected from the group consisting of foils, powders, meshes, staples, buttons, and fibers. In some particularly preferred embodiments, the metal material comprises a powder selected from the group consisting of aluminum, copper, iron, and oxides thereof.

In another embodiment, the present invention relates to an oxygen scavenging packaging article, comprising:

an oxygen scavenging polymer comprising units having structure I:

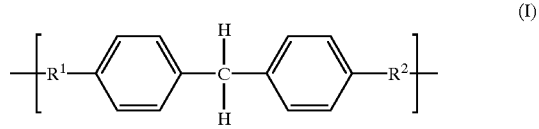

(I)

wherein $R^1$ and $R^2$ are independently selected from the group consisting of —O—, —C(=O)O—, —NH—, —NHC(=O)—, —NHC(=O)O—, and —NR—, wherein R is selected from the group consisting of —H and —$C_1$-$C_6$ alkyls;

a transition metal oxidation catalyst; and an energy-absorbing compound selected from the group consisting of microwave reactive materials and photoinitiators having a wavelength of maximum absorption of electromagnetic radiation from about 200 nm to about 750 nm.

Packaging articles typically come in several forms including a single layer film, a multilayer film, a single layer rigid article, or a multilayer rigid article. Typical rigid or semi-rigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles either comprise single or multiple layers of material.

The packaging article comprising the oxygen scavenging layer can be used to package any product for which it is desirable to inhibit oxygen damage during storage, e.g. food, beverage, pharmaceuticals, medical products, corrodible metals, or electronic devices.

The packaging article comprising the oxygen scavenging layer can comprise a single oxygen scavenging layer, or an oxygen scavenging layer and additional layers, such as an oxygen barrier layer, a food-contact layer, a structural layer, or an adhesive layer, alone or in any combination. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques.

As stated above, the packaging article comprises an oxygen scavenging layer. In the oxygen scavenging layer of the oxygen scavenging packaging article, the polymer, the transition metal oxidation catalyst, and the energy-absorbing compound are as described above. By "energy-absorbing compound" is meant a compound that absorbs electromagnetic radiation (such as ultraviolet light, visible light, or microwaves, among others) and converts at least a portion of the energy of the radiation into chemical reactions that lead to initiation of oxygen scavenging. The polymer may further comprise units such as structure III, or other units, as described above.

The polymer may comprise from about 5 wt % to 100 wt % of the oxygen scavenging layer. Preferably, the polymer comprises from about 20 wt % to about 80 wt % of the oxygen scavenging layer.

Other compounds are commonly used with oxygen scavenging polymers, in order to enhance the functionality of the oxygen scavenging polymers in storage, processing into a layer of a packaging article, or use of the packaging article. Such enhancements include, but are not limited to, limiting the rate of oxygen scavenging by the oxygen scavenging polymer prior to filling of the packaging article with a product, initiating oxygen scavenging by the oxygen scavenging polymer at a desired time, limiting the induction period (the period between initiating oxygen scavenging and scavenging of oxygen at a desired rate), or rendering the layer comprising the oxygen scavenging polymer stronger or more transparent, among others. These compounds can be added to the oxygen scavenging layer or another layer of the packaging article, as appropriate for the intended function of the compound.

Other additives can be added to further facilitate or control the initiation of oxygen scavenging properties. Also, additional components such as a structural polymer or polymers can be added to render the layer more adaptable for use in a packaging article. Particular additives and components to be included in the oxygen scavenging layer can be readily chosen by the skilled artisan, depending on the intended use of the oxygen scavenging layer and other parameters.

Antioxidants may be used to control scavenging initiation by the oxygen scavenging layer. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the oxygen scavenging layer, the packaging article (and incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on oxygen scavenging. As mentioned earlier, such materials are usually present in oxidizable organic compounds or structural polymers to prevent oxidation or gelation of the polymers. Typically, they are present in about 0.01 to 1% by weight of the composition. However, additional amounts of antioxidant may also be added if it is desired to tailor the induction period as described above.

The packaging article may also comprise a transition metal oxidation catalyst, either in the oxygen scavenging layer or in a layer adjacent thereto. The transition metal oxidation catalyst is as described above.

Other additives which can be included in the oxygen scavenging layer include, but are not necessarily limited to, fillers, pigments, dyestuffs, stabilizers, processing aids, plasticizers, fire retardants, and anti-fog agents, among others.

Any other additives employed normally will not comprise more than 10% of the oxygen scavenging layer by weight, with preferable amounts being less than 5% by weight of the oxygen scavenging layer.

In the oxygen scavenging layer, the oxygen scavenging polymer can be blended with one or more commercially-available polymers, as will be described in more detail as follows.

The oxygen scavenging layer can comprise film- or rigid-article-forming structural polymers. Such polymers are thermoplastic and render the oxygen scavenging layer more adaptable for use in a packaging article. They also may, to some extent, have oxygen scavenging properties. These structural polymers are blended with the oxygen scavenging polymer. Suitable structural polymers include, but are not limited to, polyethylene, low density polyethylene, very low density polyethylene, ultra-low density polyethylene; high density polyethylene, polyethylene terephthalate (PET), polyvinyl chloride, ethylene-vinyl acetate, ethylene-alkyl (meth)acrylates, ethylene-(meth)acrylic acid, or ethylene-(meth)acrylic acid ionomers. In rigid articles, such as beverage containers, PET is often used. Blends of different structural polymers may also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a structural polymer which is incompatible with the oxygen scavenging polymer.

Preferably, the structural polymer is PET.

Also, the oxygen scavenging layer can comprise an oxygen barrier polymer. These oxygen barrier polymers are blended with the oxygen scavenging polymer. Typical oxygen barrier polymers include poly(ethylene vinyl alcohol) (EVOH), polyacrylonitrile, polyvinyl chloride (PVC), poly (vinylidene dichloride), polyethylene terephthalate (PET), and polyamides.

The oxygen scavenging layer can comprise a polymer or polymers other than those described above, as will be apparent to one of ordinary skill in the art.

The oxygen scavenging layer may be in the form of a layer, film, liner, coating, sealant, gasket, adhesive insert, non-adhesive insert, or fibrous mat insert in the packaging article.

The packaging article comprising the oxygen scavenging layer can comprise a single oxygen scavenging layer or an oxygen scavenging layer and additional layers. The additional layers of a multilayer material may comprise at least one oxygen barrier layer, i.e. a layer having an oxygen transmission rate equal to or less than 500 cubic centimeters per square meter (cc/m$^2$) per day per atmosphere at room temperature (about 25° C.). Typical oxygen barrier layers comprise poly(ethylene vinyl alcohol) (EVOH), polyacrylonitrile, polyvinyl chloride (PVC), poly (vinylidene dichloride), polyethylene terephthalate (PET), polyamides, aluminum, silica, or mixtures thereof. If the oxygen barrier layer comprises EVOH, the packaging article preferably further comprises a moisture barrier layer. Any polymers capable of providing a moisture barrier and being formed into a layer of the packaging article may be used. The moisture barrier layer preferably comprises polyethylene, polyethylene terephthalate (PET), or a mixture thereof.

The additional layers of a multilayer material may comprise at least one structural layer, i.e. a layer imparting strength, rigidity, or other structural properties to the material. The structural layer can comprise polyethylene, low density polyethylene, very low density polyethylene, ultra-low density polyethylene, high density polyethylene, polypropylene, polyethylene terephthalate (PET), polyethylene naphthalate (PEN), nylon, polyvinyl chloride, ethylene-vinyl acetate, ethylene-alkyl (meth)acrylates, ethylene-(meth)acrylic acid, ethylene-(meth)acrylic acid ionomer, aluminum foil, or paperboard. PET, aluminum foil, or paperboard are preferred.

Other additional layers of the packaging article may include one or more layers which are permeable to oxygen.

Further additional layers, such as adhesive layers, may also be used. Compositions typically used for adhesive layers include anhydride functional polyolefins and other well-known adhesive layers.

The oxygen scavenging packaging article can be formed by any appropriate technique. By way of example, and not to be construed as limiting, forming the oxygen scavenging packaging article will involve preparing the oxygen scavenging composition and other compounds to be included therein, heating the composition to a temperature above the melting point of the polymer with stirring to produce a homogeneous melt, and subsequent formation of the packaging article or oxygen scavenging layer thereof from the melt. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques. Not all of these techniques requiring formation of a melt comprising the polymer. Other techniques for forming an oxygen scavenging packaging article of the present invention may be apparent to one of ordinary skill in the art.

In yet another embodiment, the present invention relates to a method of initiating oxygen scavenging by an oxygen scavenging composition, comprising:

(a) providing an oxygen scavenging composition, comprising:
  (i) an oxygen scavenging polymer comprising units having structure I:

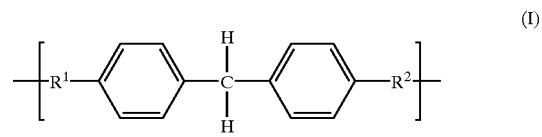

(I)

wherein R$^1$ and R$^2$ are independently selected from the group consisting of —O—, —C(=O)O—, —NH—, —NHC(=O)—, —NHC(=O)O—, and —NR—, wherein R is selected from the group consisting of —H and —C$_1$–C$_6$ alkyls;
  (ii) a transition metal oxidation catalyst; and
  (iii) an energy-absorbing compound selected from the group consisting of microwave reactive materials and photoinitiators having a wavelength of maximum absorption of electromagnetic radiation from about 200 nm to about 750 nm; and (b) exposing the oxygen scavenging composition to electromagnetic radiation for a duration sufficient to initiate oxygen scavenging by the oxygen scavenging composition.

The oxygen scavenging composition is as described above. The oxygen scavenging composition can be a solid or a melt, and as a solid it can be in the form of a packaging article or an oxygen scavenging layer thereof. Preferably, the exposure is performed when the oxygen scavenging composition has been formed into a packaging article or an oxygen scavenging layer thereof. More preferably, the exposure is performed no more than 1 hr prior to filling of the packaging article with a product.

In the performance of the method, the oxygen scavenging composition, in whatever form it is provided, is exposed to electromagnetic radiation. Though not to be bound by theory, it is believed that electromagnetic radiation is absorbed by the energy-absorbing component of the oxygen scavenging composition, and at least some of the energy of the electromagnetic radiation drives chemical reactions that activate oxygen scavenging. Electromagnetic radiation of essentially any peak wavelength (i.e., the wavelength of maximum intensity) can be used.

The optimal duration of the exposure will depend on the peak wavelength of the electromagnetic radiation, the wavelength of maximum absorption of the energy-absorbing compound, the intensity of the electromagnetic radiation, and the geometry of the radiation source and the composition, among other parameters apparent to one of ordinary skill in the art. The duration can be readily adjusted by adjusting one or more of the parameters as the user may desire.

The closer the peak wavelength of the electromagnetic radiation is to the wavelength of maximum absorption of the energy-absorbing compound, the greater the fraction of the electromagnetic radiation's energy that will be absorbed. Thus, either less intense electromagnetic radiation, a shorter duration of exposure, or both are possible, relative to the situation where the peak wavelength of the electromagnetic radiation is further from the wavelength of maximum absorption of the energy-absorbing compound. Preferably, the electromagnetic radiation has a peak wavelength from about 50 nm shorter than the wavelength of maximum absorption of the energy-absorbing compound to about 50 nm longer than the wavelength of maximum absorption of the energy-absorbing compound. More preferably, the electromagnetic radiation has a peak wavelength from about 10 nm shorter than the wavelength of maximum absorption of the energy-absorbing compound to about 10 nm longer than the wavelength of maximum absorption of the energy-absorbing compound.

The electromagnetic radiation can be provided by any appropriate source.

In still another embodiment, the present invention relates to a method of forming a polymer, comprising:

providing at least a monomer having structure IV:

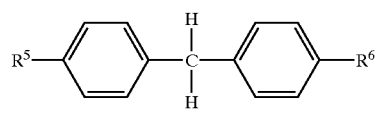

(IV)

wherein $R^5$ and $R^6$ are independently selected from the group consisting of —OH, —OR, —C(=O)OH, —C(=O)OR, —NH$_2$, —NHR, —NR$_2$, —NHC(=O)H, —NHC(=O)R, —NHC(=O)OH, and —NHC(=O)OR, wherein R is selected from the group consisting of —H and —C$_1$–C$_6$ alkyls; and a monomer having structure VI:

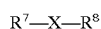 (VI)

wherein X is a hydrocarbon or substituted hydrocarbon; and $R^7$ and $R^8$ are selected from the group consisting of —OH, —OR, —C(=O)OH, —C(=O)OR, —NH$_2$, —NHR, —NR$_2$, —NHC(=O)H, —NHC(=O)R, —NHC(=O)OH, —NHC(=O)OR, and -halide, wherein R is selected from the group consisting of —H and —C$_1$–C$_6$ alkyls; and condensation polymerizing at least the monomer having structure IV and the monomer having structure VI, to form the polymer.

In structure VI, X is as described above. The monomers having structure IV and structure VI may be may be commercially available, or may be synthesized by techniques known in the art.

Condensation polymerizing can be performed following techniques that are known in the art. Generally, the monomers are combined in a reactor under conditions where the monomers react (such as, for example, by transesterification, transamidation, etc., depending on the structures of $R^5$, $R^6$, $R^7$, and $R^8$) to polymerize the monomers, evolving a byproduct, typically water, methanol, etc., depending on the structures of $R^5$, $R^6$, $R^7$, and $R^8$.

In yet a further embodiment, the present invention relates to a method of producing a packaging article comprising an oxygen scavenging layer, wherein the oxygen scavenging layer comprises a polymer comprising structure I:

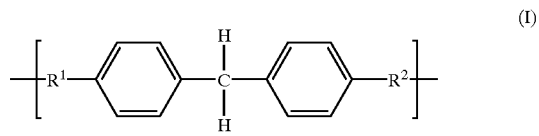

(I)

wherein $R^1$ is selected from the group consisting of —O— and —NH—, and $R^2$ is selected from the group consisting of —O— and —NH—, the method comprising:

providing a composition comprising the polymer comprising structure I, and forming the composition into a packaging article or an oxygen scavenging layer thereof.

The polymer, and a method for synthesizing it, are described above. The forming step can involve any appropriate technique for forming the polymer, plus any other compounds, into a packaging article or an oxygen scavenging layer thereof. Typically, the forming step will involve preparing a composition of the polymer and other compounds to be included therein, heating the composition to a temperature above the melting point of the polymer with stirring to produce a homogeneous melt, and subsequent formation of the packaging article or oxygen scavenging layer thereof from the melt. As stated above, single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques. Not all of these techniques requiring formation of a melt comprising the polymer.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Demonstration of Oxyen Scavenging Property of Polymer Containing Methylenebisphenyl Structural Unit In order to demonstrate the concept that a polymer, when it contains a methylenebisphenyl structural unit, is capable of scavenging oxygen in the presence of a oxidation catalyst, we used a commercially available poly[4,4'-methylenebis(phenyl isocyanate)-alt-1,4-butanediol/poly(butylene adipate)]. This polymer was purchased from Aldrich (Catalog Number: 43018-8) in pellet form, which has a melt index of 13 g/10 min at 190° C./8.7 Kg (ASTM D 1238) and Tg of –15° C. by DSC method. The chemical structure (V) is shown below.

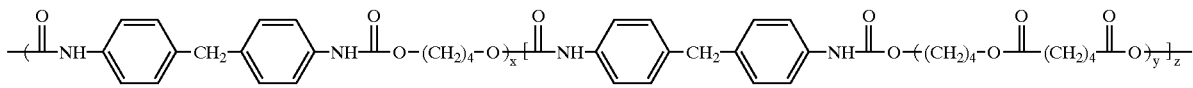

Cobalt neodecanoate from Shepherd Chemical Company was used as the oxidation catalyst.

A known quantity of cobalt neodecanoate in dichloromethane solution was coated over the known quantity of pellets of poly[4,4'-methylenebis(phenyl isocyanate)-alt-1,4-butanediol/poly(butylene adipate)]. The solution was allowed to be soaked into the pellets over a period of 2 hours under agitation and the solvent was then removed from the pellets under a high vacuum at room temperature over a period of 12 hours. The resulting pellets were then compounded on a Hakke twin screw extruder and pelletized. For the compounding processing, a flat temperature profile was used for all four zones on the Hakke extruder and the temperature was set either at 160° C. or 180° C. as described in the table below. The screw speed was set at 20 rpm for all the samples.

TABLE 1

Composition and Processing Condition

| Sample | Polymer, (% w.t.) | Cobalt Neodecanoate (% w.t.) | Process Temperature, ° C. |
|---|---|---|---|
| Sample 1 | 99% | 1% | 160 |
| Sample 2 | 99% | 1% | 180 |
| Sample 3 | 99.5% | 0.5% | 160 |

Headspace Oxygen Scavenging Test:

The oxygen scavenging activity of the prepared samples were assessed by monitoring the changes in oxygen concentration in a closed system. Thus, 5 gram of pellets of each sample was placed into a leak-proof aluminum bag containing 300 cc air. The oxygen concentration in the bag was periodically analyzed by using a Mocon HS750 Headspace Oxygen Analyzer. The results were listed in table 2, and the changes of %oxygen in headspace over time are plotted in FIG. 1.

TABLE 2

Reduction of Oxygen in Headspace over Time (Days)

| Time (Days) | Sample 1 Oxygen (%) | Sample 2 Oxygen (%) | Sample 3 Oxygen (%) |
|---|---|---|---|
| 0 | 21.1 | 20.9 | 21 |
| 1 | 18.1 | 17.6 | 19.3 |
| 2 | 16.3 | 16.8 | 18.4 |
| 3 | | | 18 |
| 4 | | | |
| 5 | 15.4 | 15.6 | |
| 6 | | | |
| 7 | | | 17.4 |
| 8 | | | 17.1 |
| 9 | | | |
| 10 | | | |
| 11 | 15.3 | 15.6 | |

The results indicate all samples containing the oxidation catalyst started scavenging oxygen immediately after the samples were produced from the extrusion process at indicated temperatures. It also showed that the two processing temperatures at either 160° C. or 180° C. had relatively small influence on the scavenging activity (sample 1 vs. sample 2), whereas the catalyst level in the polymer did show a significant impact on the oxygen scavenging activity (sample 1 vs. sample 3). This was expected as it is known in the art that the cobalt salt is an efficient oxidation catalyst for the oxidation of oxidation liable hydrocarbon, which results in the oxygen consumption as observed in this example.

One of ordinary skill in the art would expect that oxygen scavenging would commence even more rapidly upon inclusion of an energy-absorbing compound into the composition and exposure of the composition to electromagnetic radiation readily absorbed by the energy-absorbing compound.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen scavenging composition, comprising:
  an oxygen scavenging polymer comprising units having structure I:

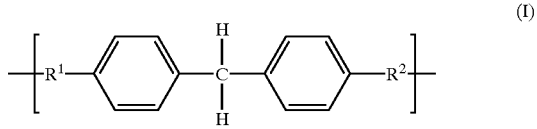

wherein R¹ and R² are independently selected from the group consisting of —O—, —C(=O)O—, —NH—, —NHC(=O)—, —NHC(=O)O—, and —NR—, wherein R is selected from the group consisting of —H and —C₁–C₆ alkyls;
  a transition metal oxidation catalyst; and
  a photoinitiator having a wavelength of maximum absorption of electromagnetic radiation from about 200 nm to about 750 nm.

2. The oxygen scavenging composition of claim 1, wherein the polymer further comprises structure III:

wherein X is a hydrocarbon or substituted hydrocarbon.

3. The oxygen scavenging composition of claim 1, wherein the transition metal oxidation catalyst is a cobalt salt.

4. The oxygen scavenging composition of claim 3, wherein the cobalt salt is selected from the group consisting of cobalt oleate, cobalt stearate, and cobalt neodecanoate.

5. The oxygen scavenging composition of claim 1, wherein the photoinitiator is selected from the group consisting of benzophenone derivatives containing at least two benzophenone moieties and having the formula:

$$A_a(B)_b$$

wherein
A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;

a is an integer from 0 to 11;

B is a substituted or unsubstituted benzophenone group; and b is an integer from 2 to 12.

6. The oxygen scavenging composition of claim 5, wherein the photoinitiator is selected from the group consisting of dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

7. An oxygen scavenging packaging article, comprising:
an oxygen scavenging polymer comprising units having structure I:

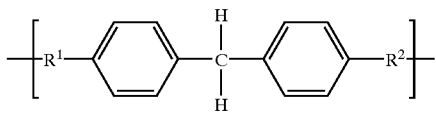

(I)

wherein R$^1$ and R$^2$ are independently selected from the group consisting of —O—, —C(=O)O—, —NH—, —NHC(=O)—, —NHC(=O)O—, and —NR—, wherein R is selected from the group consisting of —H and —C$_1$–C$_6$ alkyls;

a transition metal oxidation catalyst; and an energy-absorbing compound selected from the group consisting of microwave reactive materials and photoinitiators having a wavelength of maximum absorption of electromagnetic radiation from about 200 nm to about 750 nm.

8. The packaging article of claim 7, wherein the oxygen scavenging polymer further comprises structure III:

—X— (III)

wherein X is a hydrocarbon or substituted hydrocarbon.

9. The packaging article of claim 7, wherein the transition metal catalyst is a cobalt salt.

10. The packaging article of claim 9, wherein the cobalt salt is selected from the group consisting of cobalt oleate, cobalt stearate, and cobalt neodecanoate.

11. The packaging article of claim 7, wherein the energy-absorbing compound is a photoinitiator selected from the group consisting of benzophenone derivatives containing at least two benzophenone moieties and having the formula:

$$A_a(B)_b$$

wherein
A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;

a is an integer from 0 to 11;

B is a substituted or unsubstituted benzophenone group; and b is an integer from 2 to 12.

12. The packaging article of claim 11, wherein the photoinitiator is selected from the group consisting of dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

13. The packaging article of claim 7, further comprising an antioxidant in the oxygen scavenging layer.

14. The packaging article of claim 13, wherein the antioxidant is selected from the group consisting of 2,6-di(t-butyl)-4-methylphenol(BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate.

15. The packaging article of claim 7, wherein the oxygen scavenging layer further comprises an oxygen barrier polymer selected from the group consisting of poly(ethylene vinyl alcohol) (EVOH), polyacrylonitrile, polyvinyl chloride (PVC), poly(vinylidene dichloride), polyethylene terephthalate (PET), and polyamide.

16. The packaging article of claim 7, further comprising an oxygen barrier layer.

17. The packaging article of claim 16, wherein the oxygen barrier layer comprises poly(ethylene vinyl alcohol) (EVOH), polyacrylonitrile, polyvinyl chloride (PVC), poly (vinylidene dichloride), polyethylene terephthalate (PET), or polyamide.

18. The packaging article of claim 17, wherein the oxygen barrier layer comprises EVOH, and the packaging article further comprises a moisture barrier layer.

19. The packaging article of claim 18, wherein the moisture barrier layer comprises polyethylene, polyethylene terephthalate (PET), or a mixture thereof.

20. The packaging article of claim 7, further comprising a structural layer.

21. The packaging article of claim 20, wherein the structural layer comprises polyethylene, low density polyethylene, very low density polyethylene, ultra-low density polyethylene, high density polyethylene, polypropylene, polyethylene terephthalate (PET), polyethylene naphthalate (PEN), nylon, polyvinyl chloride, ethylene-vinyl acetate, ethylene-alkyl (meth)acrylates, ethylene-(meth)acrylic acid, ethylene-(meth)acrylic acid ionomers, aluminum foil, or paperboard.

22. The packaging article of claim 21, wherein the structural layer comprises PET, aluminum foil, or paperboard.

23. The packaging article of claim 7, wherein the oxygen scavenging layer is a liner, coating, sealant, gasket, adhesive insert, non-adhesive insert, or fibrous mat insert in the packaging article.

24. The packaging article of claim 7, wherein the packaging article is in the form of a single layer film, a multilayer film, a single layer rigid article, or a multilayer rigid article.

25. A method of initiating oxygen scavenging by an oxygen scavenging composition, comprising:
(a) providing an oxygen scavenging composition, comprising:
  (i) an oxygen scavenging polymer comprising units having structure I:

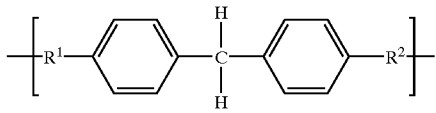
  (I)

wherein R¹ and R² are independently selected from the group consisting of —O—, —C(=O)O—, —NH—, —NHC(=O)—, —NHC(=O)O—, and —NR—, wherein R is selected from the group consisting of —H and —C₁–C₆ alkyls;
  (ii) a transition metal oxidation catalyst; and
  (iii) an energy-absorbing compound selected from the group consisting of microwave reactive materials and photoinitiators having a wavelength of maximum absorption of electromagnetic radiation from about 200 nm to about 750 nm; and
(b) exposing the oxygen scavenging composition to electromagnetic radiation for a duration sufficient to initiate oxygen scavenging by the oxygen scavenging composition.

26. The method of claim 25, wherein the electromagnetic radiation has a peak wavelength from about 50 nm shorter than the wavelength of maximum absorption of the energy-absorbing compound to about 50 nm longer than the wavelength of maximum absorption of the energy-absorbing compound.

27. The method of claim 26, wherein the electromagnetic radiation has a peak wavelength from about 10 nm shorter than the wavelength of maximum absorption of the energy-absorbing compound to about 10 nm longer than the wavelength of maximum absorption of the energy-absorbing compound.

28. The method of claim 25, wherein the polymer further comprises structure III:

 (III)

wherein X is a hydrocarbon or substituted hydrocarbon.

29. The method of claim 25, wherein the transition metal oxidation catalyst is a cobalt salt.

30. The method of claim 29, wherein the cobalt salt is selected from the group consisting of cobalt oleate, cobalt stearate, and cobalt neodecanoate.

31. The method of claim 25, wherein the energy-absorbing compound is a photoinitiator selected from the group consisting of benzophenone derivatives containing at least two benzophenone moieties and having the formula:

A$_a$(B)$_b$ wherein
  A is a bridging group selected from sulfur; oxygen; carbonyl; —SiR"₂—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;
  a is an integer from 0 to 11;
  B is a substituted or unsubstituted benzophenone group; and
  b is an integer from 2 to 12.

32. The method of claim 31, wherein the photoinitiator is selected from the group consisting of dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

33. An oxygen scavenging composition, comprising:
an oxygen scavenging polymer comprising units having structure I:

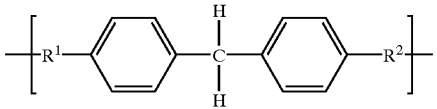
(I)

wherein R¹ and R² are independently selected from the group consisting of —O—, —C(=O)O—, —NH—, —NHC(=O)—, —NHC(=O)O—, and —NR—, wherein R is selected from the group consisting of —H and —C₁–C₆ alkyls;
a transition metal oxidation catalyst; and
a microwave reactive material.

34. The oxygen scavenging composition of claim 33, wherein the polymer further comprises structure III:

 (III)

wherein X is a hydrocarbon or substituted hydrocarbon.

35. The oxygen scavenging composition of claim 33, wherein the transition metal oxidation catalyst is a cobalt salt.

36. The oxygen scavenging composition of claim 35, wherein the cobalt salt is selected from the group consisting of cobalt oleate, cobalt stearate, and cobalt neodecanoate.

37. The oxygen scavenging composition of claim 33, wherein the microwave reactive material is selected from the group consisting of water, sodium percarbonate, potassium percarbonate, calcium percarbonate, sodium percarbonate, 2,5-dimethyl-2,5-di(benzoylperoxy) hexane; t-amyl peroxyacetate; t-amyl peroxybenzoate; t-butyl peroxyacetate; t-butyl peroxybenzoate; di-t-butyl diperoxyphthalate; 2,2-di-(t-butylperoxy) butane; 2,2-di(t-amylperoxy) propane; n-butyl 4,4-di(t-butylperoxy) valerate; ethyl 3,3-di-(t-amylperoxy) butyrate; ethyl 3,3-(t-butylperoxy) butyrate; di-α-cumyl peroxide; α,α'-di-(t-butylperoxy) diisopropylbenzene; 2,5-dimethyl-2,5-di-(t-butylperoxy) hexane; di-t-amyl peroxide; t-butyl α-cumyl peroxide; di-t-butyl peroxide; 2,5-dimethyl-2,5-di-(t-butylperoxy)-3-hexyne; di-t-butyl peroxide; di-t-amyl peroxide; t-butyl hydroperoxide; aluminum powder; copper powder; and iron powder.

38. A method of producing a packaging article comprising an oxygen scavenging layer, wherein the oxygen scavenging layer comprises a polymer comprising structure I:

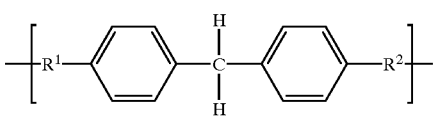
(I)

wherein R¹ is selected from the group consisting of —O— and —NH—, and R² is selected from the group consisting of —O— and —NH—, the method comprising:
  (i) providing a composition comprising the polymer comprising structure I, and
  (ii) forming the composition into a packaging article or an oxygen scavenging layer thereof.

* * * * *